(12) United States Patent
Krantz et al.

(10) Patent No.: US 7,174,647 B2
(45) Date of Patent: Feb. 13, 2007

(54) LASER LINE PROJECTOR WITH SPHERICALLY ROTATABLE SUPPORT AND LEVEL/PLUMB INDICATORS FOR THE SUPPORT

(75) Inventors: Norman L. Krantz, San Jose, CA (US); Jeffrey A. Fox, San Jose, CA (US)

(73) Assignee: Zircon Corporation, Campbell, CA (US)

(*) Notice: Subject to any disclaimer, the term of this patent is extended or adjusted under 35 U.S.C. 154(b) by 0 days.

(21) Appl. No.: 11/225,702

(22) Filed: Sep. 12, 2005

(65) Prior Publication Data

US 2006/0059699 A1    Mar. 23, 2006

Related U.S. Application Data

(60) Provisional application No. 60/611,791, filed on Sep. 20, 2004.

(51) Int. Cl.
*G01C 15/00* (2006.01)

(52) U.S. Cl. ............. 33/286; 33/DIG. 21; 33/DIG. 1

(58) Field of Classification Search ............. 33/286, 33/DIG. 21, DIG. 1, 281, 282, 283, 285, 33/290, 353, 379, 389, 390
See application file for complete search history.

(56) References Cited

U.S. PATENT DOCUMENTS

| | | | | |
|---|---|---|---|---|
| 2,635,350 A * | 4/1953 | Bettega | ................... | 33/381 |
| 4,160,285 A * | 7/1979 | Shibla | ................... | 362/145 |
| 4,796,198 A * | 1/1989 | Boultinghouse et al. | ...... | 701/23 |
| 5,421,094 A * | 6/1995 | McCord et al. | ................ | 33/373 |
| 5,539,990 A * | 7/1996 | Le | ................... | 33/283 |
| 5,572,796 A * | 11/1996 | Breda | ................... | 33/283 |
| 5,572,797 A * | 11/1996 | Chase | ................... | 33/286 |
| 5,575,073 A * | 11/1996 | von Wedemayer | ........... | 33/365 |
| 5,754,287 A * | 5/1998 | Clarke | ................... | 356/250 |
| 6,163,969 A * | 12/2000 | Jan et al. | ................... | 33/282 |
| 6,351,890 B1* | 3/2002 | Williams | ................... | 33/286 |
| 6,588,115 B1* | 7/2003 | Dong | ................... | 33/227 |
| 6,606,798 B2* | 8/2003 | El-Katcha et al. | ............ | 33/290 |
| 6,609,307 B1* | 8/2003 | Haynes et al. | ................ | 33/286 |
| 6,733,153 B1* | 5/2004 | Lee | ................... | 362/191 |
| 6,782,034 B2* | 8/2004 | Li | ................... | 372/109 |
| 6,874,739 B1* | 4/2005 | Gregory | ................... | 248/188.4 |
| 6,978,052 B2* | 12/2005 | Beged-Dov et al. | ........ | 382/284 |
| 7,059,058 B2* | 6/2006 | Kousek et al. | ................ | 33/290 |
| 2002/0092186 A1* | 7/2002 | Napier et al. | ................ | 33/286 |
| 2005/0008043 A1* | 1/2005 | Kousek et al. | ................ | 372/15 |
| 2005/0274029 A1* | 12/2005 | Kavounas | ................... | 33/286 |

* cited by examiner

*Primary Examiner*—Diego Gutierrez
*Assistant Examiner*—Amy R. Cohen
(74) *Attorney, Agent, or Firm*—MacPherson Kwok Chen & Heid LLP; Gideon Gimlan

(57) ABSTRACT

A spherically rotatable support for a light image projector has level and/or plumb indicators for leveling or plumbing a central reference frame of its spherical rotation. A projected light image, such as a laser line segment of relatively short length may be successively stepped across a long wall while maintaining its level or plumb condition. A low powered laser or other light source may be used to generate the short-length, line segment in place of a more high powered light source that would otherwise be needed to illuminate the full length of the wall or other such surface.

30 Claims, 10 Drawing Sheets

200

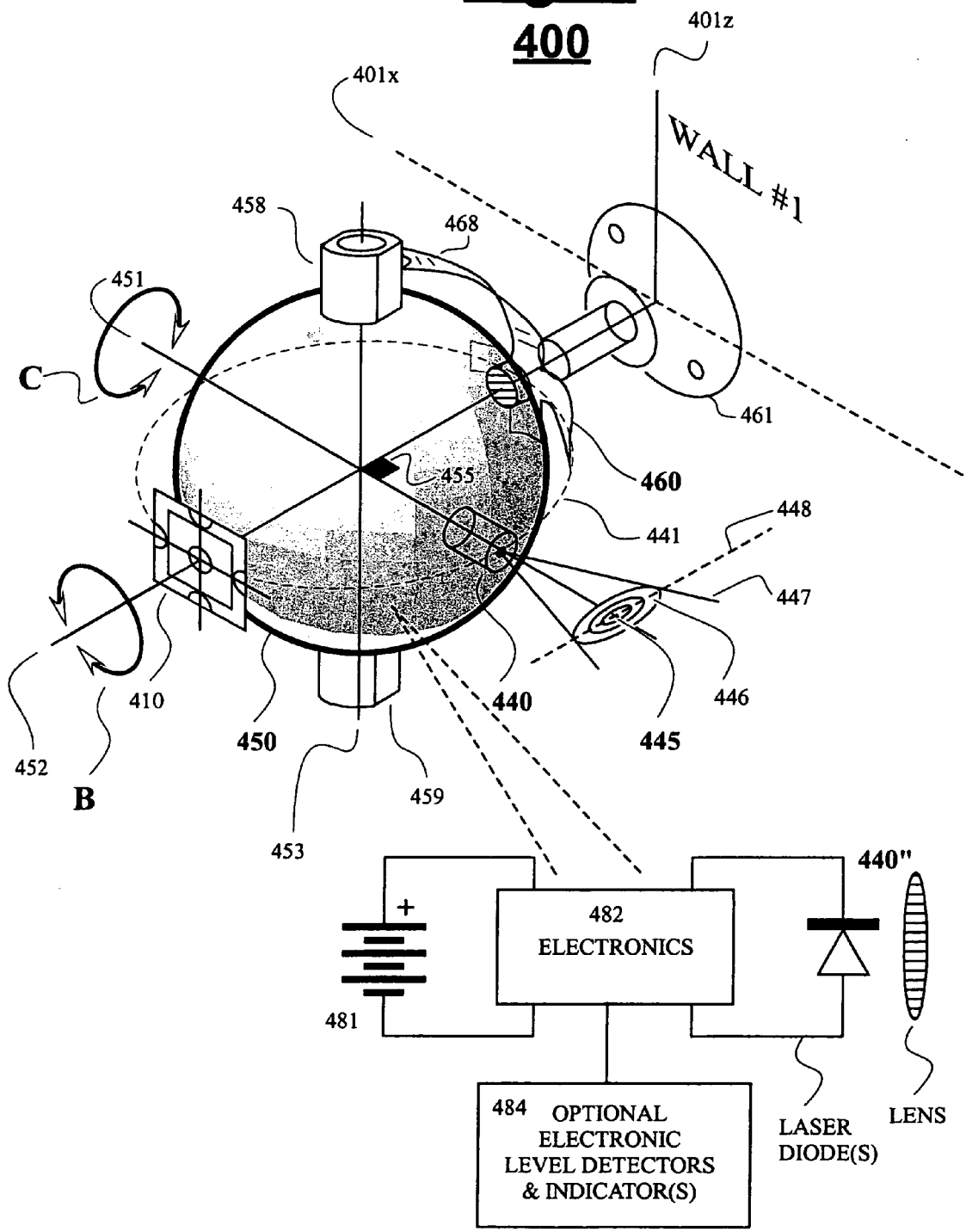

600

700

800

900

1000

LASER LINE PROJECTOR WITH SPHERICALLY ROTATABLE SUPPORT AND LEVEL/PLUMB INDICATORS FOR THE SUPPORT

CROSS REFERENCE TO APPLICATION

This application is owned by the owner of the following provisional application from which benefit of priority is claimed: U.S. Provisional Application Ser. No. 60/611,791 filed Sep. 20, 2004 by Norman L. Krantz and Jeffrey A. Fox entitled, "Laser Line Projector with Spherically Rotatable Support and Level/Plumb Indicators for the Support".

FIELD OF DISCLOSURE

The present invention relates generally to laser line projectors such as used in the construction industry for laying out straight lines along walls or other objects. The disclosure relates more specifically to portable laser line projectors having small form factors where the projectors are typically mounted to a wall and used to project a leveled line along that wall.

DESCRIPTION OF RELATED ART

Laser line projectors have been a boon to the construction industry, helping workmen to layout straight and leveled or plumbed lines along walls or other objects. Many designs for laser line projectors exist, ranging from very complicated and expensive ones that mount on large tripods, generate a plurality of very precise beams of light in different directions and automatically level and precisely square up their respective beams; to very simple and inexpensive ones where the user is expected to manually level a single beam of low power light so it is aimed essentially parallel to and level against the wall from which the beam's illuminated line will reflect back to the user so the user perceives a straight line being projected across the wall.

A problem persists in the use of the manually aimed, small and portable projectors. It is difficult to form a projected line of uniform beam intensity (reflected intensity) along a long wall, say one that is about 10 to 30 feet or longer. Government regulations limit the maximum power output of manually aimed projectors to about 5 milliwatts (5 mW, this maximum also known as Class IIIA) and this limitation in turn limits the useful length of a projected line. The reason for the power limitation is that users can accidentally point the center of the laser beam directly toward an eye and injure themselves or others.

When a conventional, manually aimed and wall-mounted laser line projector is used, beam intensity is tailored with optics so that the most intense part of the projected fanout will be is aimed at slightly less than parallel (about 2 degrees or less off the parallel) toward the wall on which the fanout will project its illuminating line. A fresnel lens or the like is used to fan the rays so the most intense part of the projected beam will shoot out farthest to the far end of the generated line. Users typically note that the intensity of the illuminated line on the wall paradoxically appears to be strongest near its far end (about 10 to 30 feet away from the projector housing) and that it becomes weak and disappears well before it nears the opening from which it is projected outwardly towards the wall. The reason for this is that the users are actually seeing the effects of the optics. The optics sacrifices the near end intensity in order to maximize the far end intensity of the fanned-out rays.

The problem which arises with such fanout-generated lines is that the portion of fanout nearest to the projector housing is the most faded out part of the line illuminating the wall because that near section is actually relatively far from the intensified far end of the fanout. As the bright far end is moved along the adjacent wall to be further away from the projector housing (say 10 to 30 feet away), the nearest portion of the fanned-out illuminated line fades so much it appears to be invisible. Thus, when users employ a conventional, portable laser line projector to cast out an illuminating line of greater than 10 feet, there appears to be an illumination dead zone of many inches length adjacent to the projector and the users cannot mark-off wall locations that are aligned to the projected laser line but close to the projector. The problem exists even when the maximum allowed laser output power of 5 mW (Class IIIA) is used. Use a regulation-maximum output power such as Class IIIA has its own problems, including possible overheating of the laser diode and excessive drainage on batteries.

SUMMARY

In accordance with one aspect of the present invention, a spherically rotatable support is provided for supporting a light image projector. The support has level and/or plumb indicators for leveling or plumbing a central reference frame of its spherical rotation. A projected light image, such as a laser line segment of relatively short length may be successively stepped across a long wall while maintaining its level or plumb condition through use of the level and/or plumb indicators. A low powered laser or other light source may be used to generate the short-length, line segment in place of a more high powered light source that would otherwise be needed to illuminate the full length of the wall or other such surface.

More specifically, a light-pattern projecting system is provided in which a laser or other light source is mounted to a spherically rotatable support such that a clearly visible, first illuminated line (or another alignable light pattern) can be projected onto a nearby wall region when the support is spherically rotated by a first amount and such that a clearly visible, second illuminated line (or another alignable light pattern that is aligned to the first line/pattern) can be projected onto a further away wall region when the support is spherically rotated by a different second amount. One or more level and/or plumb indicators are provided on the spherically rotatable support for indicating corresponding level or plumb conditions of the projected, illuminated line/pattern when projected onto an adjacent and/or spaced away wall. In one embodiment, the support is substantially ball shaped so as to intuitively indicate to users that it is to be spherically rotated. In one embodiment, the support is magnetically attached to a wall-mountable pedestal (base) so that the support can be easily popped off one such base and moved to another base for further layout work as may be needed. In one embodiment, the wall-mountable pedestal (base) is designed to be stackably packed with other, alike wall-mountable pedestals. In one embodiment, the support is keyed so that certain spherical freedoms of rotation are blocked when the spherically rotatable support is in one or more predefined orientations relative to its movement guide.

Other aspects of the invention will become apparent from the below detailed description.

BRIEF DESCRIPTION OF THE DRAWINGS

The below detailed description section makes reference to the accompanying drawings, in which:

FIG. 4 is a perspective schematic diagram showing a spherically rotatable support in accordance with the disclosure that includes keying means for restricting certain degrees of rotational freedom when the support is in one or more predefined orientations relative to its guiding base;

DETAILED DESCRIPTION

Figure 1:
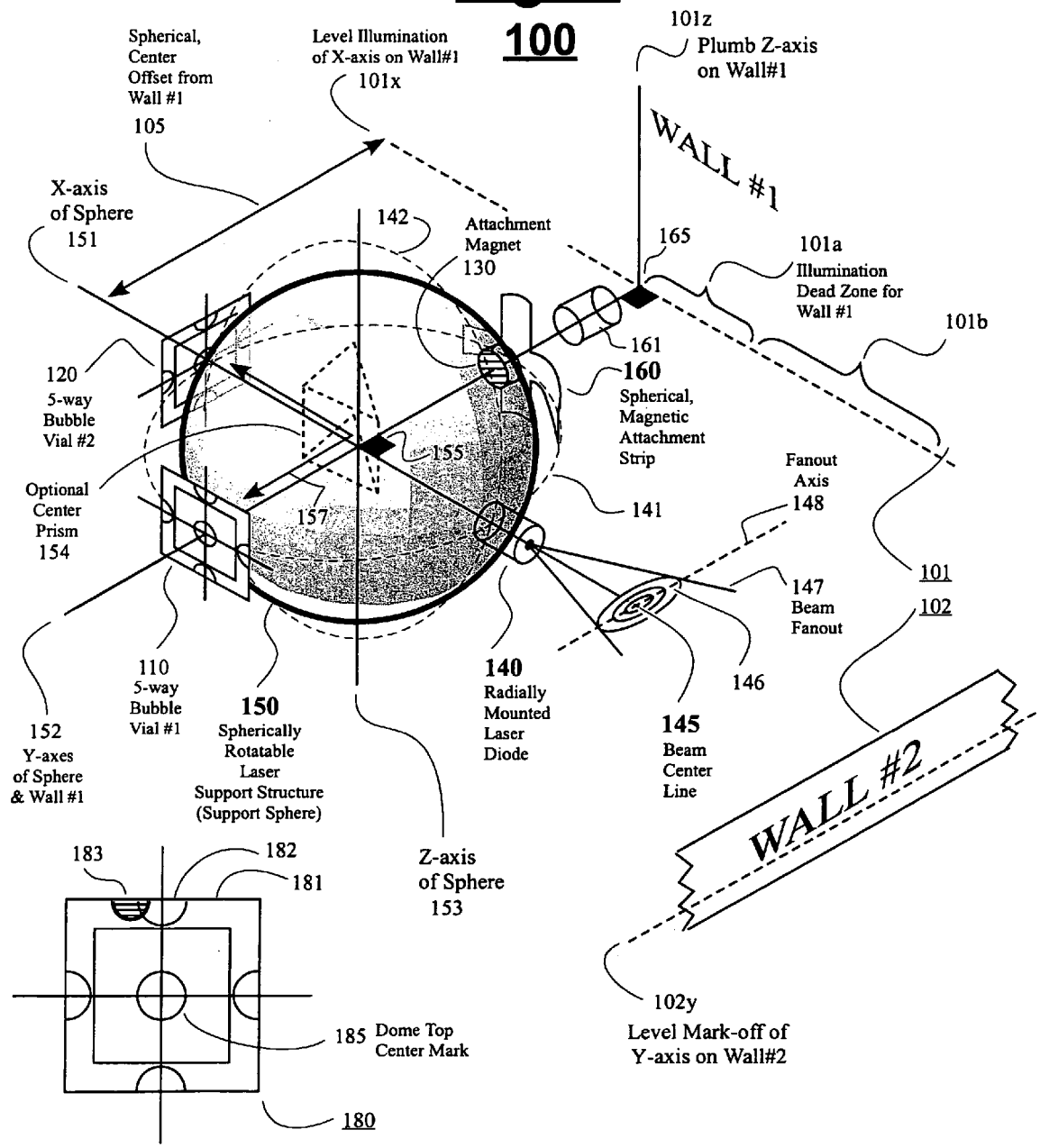
FIG. 1 is a perspective schematic diagram showing an environment in which a spherically rotatable support in accordance with the invention can be used.

FIG. 1 is a perspective schematic diagram showing a first system 100 in accordance with the invention. System 100 is designed to project the illuminated lines or other light patterns (e.g., cross hair patterns) onto adjacent surfaces such as wall 101 and/or spaced away surfaces such as wall 102. The projected line and/or other patterns are to be aligned to a gravitational force (or another invisible field) such that the lines or patterns are at a pre-specified angle relative to the level or plumb condition (or otherwise oriented according to a predefined relationship to the invisible field). Field detectors (e.g., 110, 120) are provided for aligning the projected light pattern(s) to the gravitational or other field.

In terms of a more concrete example, it is often the case that construction workmen are working in a room having first and second walls (Wall #1 and Wall #2) that are angled relative to one another (e.g., 90 degrees) where the workmen want to project a first level line, 101x onto the first wall 101 and to continue that line as a second projection, 102y onto the second wall 102 so that both projected lines 101x and 102y lie in a same, level plane. Then, pencil or other markings may be made on the wall surfaces for laying out the locations of book shelf supports, wire conduits, pipes or other structures that are to be provided about the room in an aesthetic and/or functionally optimized manner (e.g. structures that are level and/or plumb relative to gravity). Typically, a drywall or other sheet material will form the unfinished wall surfaces 101, 102 and these types of wall surfaces are neither perfectly planer nor plumb relative to gravity, nor are they exactly at 90 degrees or some other angle relative to other walls. Additionally, the wall materials may have bumps or may be intentionally textured such that linear surface sections are not inherently present in the walls. Thus it is difficult to project a clean laser line across such wall surfaces by using a parallel projecting, line projector. It is desirable to nonetheless have a wall-mountable projection system which can project level or plumb lines or other light patterns on the surrounding walls, including even the ceiling and/or floor if desired.

In one embodiment of the invention, a spherically rotatable support structure 150, such as a transparent or opaque ball (or partial ball) is provided for urging against a corresponding and mating, movement guide 160 where the movement guide 160 is structured to cause the support structure 150 to rotate spherically, thereby allowing for multiple degrees of rotational freedom. Although not fully shown, the movement guide 160 may include a spherically shaped receiving cup that receives a correspondingly mating, spherical outer shell portion of the support 150. The rotational freedom that is provided by this arrangement can be used to level a pre-defined plane (e.g., defined in FIG. 1 by equatorial major circle 141) within the support structure 150 relative to gravity or another invisible force field. A light source, such as a laser diode with appropriate optics, is mounted to the spherically rotatable support structure 150 so that a light pattern 145–147 projected from the light source 140 will be aligned in a pre-defined manner (e.g., 0 or 90 degrees) relative to the pre-defined support plane 141.

One or more level or plumb indicators are operatively coupled to the rotatable support 150 for indicting when the predefined plane 141 is in a respective level or plumb condition. In the illustrated example, first and second, five-way bubble vials, 110 and 120 are provided 90 degrees apart and tangent to the illustrated major circle 141 (which circle 141 defines the pre-defined support plane of the given example) so that a major face of indicator 110 is perpendicular to and centered about Y-axis 152 of the support while a major face of indicator 120 is similarly perpendicular to and centered about the X-axis 151 of the rotatable support 150. The horizontal center line of indicator 110 is parallel to the X-axis 151 of the support while the horizontal central axis of the second indicator 120 is parallel to the Y-axis 152 of the support 150. Thus indicator 110 can indicate whether the support's X-axis 151 (which axis moves in unison with spherical rotation of support 150) is in a plumb or level condition. Similarly, the second indicator 120 can indicate whether the support's Y-axis 152 (which also moves in unison with the spherical rotation of support 150) is in a plumb or level condition. When both of the X-axis 151 and Y-axis 152 of the support 150 are in level conditions, it is know that the pre-defined plane of the illustrated equatorial circle 141 is level. Since the light pattern 145–147 which is projected by light source 140 is pre-aligned to this equatorial circle 141, it is then know that the light pattern is also in a level condition or is otherwise oriented at a pre-defined angle (e.g., 45 degrees, 90 degrees etc.) relative to the leveled equatorial plane 141. If the equatorial plane 141 is maintained in this leveled condition and the support 150 is spherically rotated about its Z-axis 153, then the light pattern shown on walls 101 and 102, namely projected line patterns 101x and 102y will also be known to be level or otherwise oriented as desired relative to the still-level equatorial plane 141.

A method in accordance with the invention therefore comprises the steps of defining an equatorial plane (141) associated with spherical rotation of a spherically rotatable support (150) of a light source (140); leveling that equatorial plane (141); and maintaining the level condition of the equatorial plane while spherically rotating the support structure so as to move the projected light pattern 145–147 from one projection field (101b) to another such field (102y) located on adjacent or spaced away wall surfaces such as on walls 101 and 102. In the illustrated embodiment, the center of rotation 155 of the support 150 is spaced away from the adjacent wall (101) by a predefined distance 105 such as about 1 inch or greater. As a result, an illumination dead zone 101a which would have been significantly larger if offset 105 had been smaller, is significantly shrunk because the projected light pattern 145–147 can be rotated about a wide degree of angles (e.g. more than just a mere 2 or 5 degrees) to thereby cover in steps, both near and far projection fields, as will be explained more clearly in FIGS. 2–3B.

The five-way bubble vials shown at 110 and 120 are shown in an enlarged, side plan view at 180. Each vial is domed shaped at its center and filled with a viscous fluid as well as a moving gas bubble 183 or equivalent. Each has a square shape when viewed face on, as is shown at 180. The four respective sides of the square are marked off with indicia to indicate the center position (e.g., 182) of the bubble 183 when the bubble is floating along that given side. Thus if bubble 183 is centered within region 182 of respective side 181, this indicates that side 181 is at the top of the 5-way structure 180 and the corresponding side 181 is in a level condition. As the square 180 is rotated in 90 degree steps while continuing in its illustrated facing orientation, the respective new side which appears at the top becomes the new side to be leveled by moving the bubble into the centering indicia 182 of that new side. If the five-way bubble vial is rotated to be tangent to the top of the sphere 150 rather than being tangent to the equatorial circle 140, then movement of the sphere so that bubble 183 centers in the dome-topped center area 185 indicates that the Z-axis 153 of the sphere is plumb. Thus, the five-way bubble vial provides an indication in five different orientations for showing a respective level or plumb condition. While the five-way bubble vial has been described here, it is fully within the contemplation of the invention to use other types of indicators for plumb and/or level conditions including the more conventional bubble vials (see FIG. 6) and/or electronic or other means for indicating orientation relative to gravity and/or to another invisible and instrument-detectable field.

The cylindrical structure 161 shown extending off wall 101 represents part of a base or pedestal which removably mounts the guiding surface 160 to the adjacent wall 101. The entirety of the pedestal is not shown so that various guidelines can be better seen. Movement guide 160 is similarly shown as a cross-haired structure rather than in its entirety so that various guidelines can be better seen and appreciated. See also FIG. 2 and FIG. 5 for a clearer understanding of how the base and its moving guide portion may be structured in some embodiments. In the embodiment 100 of FIG. 1, the movement guide 160 is mounted to the pedestal stem 161 and the movement guide 160 is made of a ferromagnetic material so as to attract an attachment magnet 130 provided inside the spherical support structure 150. The internal attachment magnet 130 urges the support 150 towards engagement with the movement guide 160 (so that support 150 does not fall out of guide 160 when not pressed into place by a workman's hand) and it also allows the support 150 to be easily detached (popped off) from the movement guide when desired. The movement guide 160 may alternatively take on various shapes including that of a partial spherical shell such as is better indicated by item 260 of FIG. 2. No specific shape is required for the movement guide 160 given that any three points or more in three dimensional space may provide guide a corresponding sphere such as that of the illustrated support 150 towards rotating spherically about its center of spherical rotation 155 when urged against 3 or more low friction points (e.g., Teflon™ coated) of the movement guide 160. However, it is desirable to maintain some form of magnetic material of appropriate area in the region where magnetic 130 is to be attracted to the movement guide 160 so as to provide a desired amount of urging of the support into the cup-shape or other shape of the movement guide 160 over desired ranges of spherical rotation. The support 150 may have a plurality of permanent magnets such as 130 provided within its interior shell for attraction to the support guide 160. Alternatively, magnets may be provided in the support guide 160 while the ferromagnetic material is coated on the interior shell surface of the support 150. Alternatively, a variety of configurations of permanent or other magnets may be provided in both the support 150 and the guide 160 together with appropriate yoke material if desired so that attracting and/or repelling magnetic forces may be used to maintain the support 150 within the movement guide 160 or to cause it to pop out when rotated into certain predefined orientations.

When a workman is manually rotating the support structure 150 so as to point the projected light pattern 145–147 either towards far away wall 102 or the adjacent mounting wall 101, the workman (not shown) will typically be positioned to view level indicator 110 face on. In other words the workman will be facing wall 101. Since indicator 110 is facing the e workman, this allows the workman to easily determine when the horizontal center line of level indicator 110 is level, this condition indicating that the X-axis 151 of the support 150 is also level. The workman may be fooled at this stage into thinking that the major equatorial plane 141 of support 150 is also level although this is not necessarily true. The Y-axis 152 of the support may still not be level. The workman should simultaneously verify that the second level indicator 120 is also indicating a level condition at its top rim. However, remembering to do so may be difficult. It can be advantageous to provide a reminder to the workman that both of indicators 110 and 120 must show a level condition before it can be concluded that equatorial plane 141 is also level. An optical prism 154 may be optionally included around the region of the center point 155 of the spherical rotation for providing bidirectional reflection of the imagery of one of the indicators (e.g. 120) to and through a transparent portion of the other indicator (e.g. 110) so that the workman can determine with a single view that both indicators indicate a level condition. A bidirectional optical transmission path 157 is schematically shown in FIG. 1 to indicate this operation. Other means, including electronic means may be used for indicating to a workman who faces only wall 101 that a level condition has been achieved for equatorial plane 141 and for indicating what further movement may be needed for reaching the level condition if it has not yet been reached or it has been temporarily lost.

It is not necessary to have two tangential level indicators such as 110 and 120 placed at non-parallel tangent points of the equatorial circle 141 to indicate that equatorial circle 141 is in a level condition. Another way is to have a plumb indicator which is oriented parallel to Z-axis 153 for indicating when the Z-axis 153 is in a plumb condition. The plumb condition of Z-axis 153 is an alternate or additional way of verifying that the perpendicular equatorial circle 141 is in a level condition.

The length of the pedestal stem 161 may be changed from one application to another to thereby change the offset distance 105 between the center of spherical rotation 155 of support 150 and the corresponding base center 165 of the base which supports movement guide 160 where the base center 165 is along wall 101. When the offset distance 105 is increased, the spherically rotatable support can angle its corresponding image projection 145–147 onto the adjacent wall 101 at an angle that is closer to the general perpendicular of that wall 101. This can advantageously change the way that light is reflected back to the workman from the wall 101, especially if the wall has large bumps or intentional texturing. In accordance with the invention a kit of plural pedestals having different offset distances 105 are provided so that the spherically rotatable support 150 can be mounted at different offset distances, as is appropriate, away from the adjacent mounting wall 101. The pedestals or bases 161 may be mounted to the adjacent wall 101 by a variety of means including discardable sticky pads (pads with adhesive of moderate rather than strong and permanent adhesion) and by use of nails or thumb-tacks or other such mounting means.

In one embodiment, the light source 140 which projects image 145–147 includes a laser diode with a laser power output of substantially less than 5 mW. In one embodiment, the laser source 140 is a Class II laser diode having a light output power of approximately 1 mW or less. In one embodiment, rather than outputting at the pure red wavelength of 635 nm, the laser source 140 outputs at an off-red longer wavelength such as at 650 nm or 670 nm. Use of a low powered laser source L<1 mW) helps to reduce the cost of the laser source 140 and also reduces the chance that its output will cause damage to someone's eyes. It also helps to extend battery life of an internal battery (not shown, see FIG. 4) provided within the spherical support 150. Additionally, use of a wavelength greater than 635 nm such as 650 nm or 670 nm also helps to reduce the cost of the laser source in some instances. Therefore a less expensive image projector may be provided so that it may find more ubiquitous usage among all different types of construction workers including amateur home re-modelers.

FIG. 1 shows the projection of a substantially, line-like image 145–147 onto respective walls 101 and 102 for the generation of illuminated lines 101x and 102y respectively. Various other projected image patterns may be used including those having one or more cross hairs that are aligned in a pre-determined way relative to the level-able equatorial circle 141. However, it is easier to understand the invention by assuming that the projected image 145–147 is that of a fanned-out laser line. Typically, the laser diode will have a fresnel lens or other optics for causing outward divergence of its respective laser rays so as to create the beam fan out 147 as shown. Beam intensity is typically maximum near an optics defined part (e.g., the center) of projection 145 while intensity decreases as one moves to other ray areas such as 146 of the corresponding fan out 147. With the rotatable support 150 being spaced away (105) from the wall by an appropriate distance, a greater portion of the more intense regions of the beam fan-out 147 may be angled towards the wall region closest to the base 165 so that the size of the effective, illumination dead zone 101a is significantly reduced. Additionally, rotation about the Z-axis 153 while equatorial circle 141 is adjusted to remain level allows the fan-out line projection to be moved into successive wall sections such as 101b while remaining aligned to the illumination it previously created near section 101a. Less power is needed from the light source 140 because it is illuminating smaller sections 101a, 101b of the wall rather than trying to illuminate the entire length of mark-off line 101x at one time. A good working value for the spherical radius of the spherical rotation of support 150 has been found to be in the range of about 1 inch to 3 inches so that it can be easily grasped by an average workman's hand (see 205 of FIG. 2). A good offset distance 105 from the wall for these respective radii has been found to be in the range of about 1 inch to 5 inches. Various other sizes for the radius of spherical rotation and for the offset 105 may be used as appropriate. Additionally, although one light source 140 is shown projecting just a single image 145–147, it is within the contemplation of the invention to use more than one such light source each having a beam center line 145 running parallel to the leveled equatorial circle 141 so as to develop desired projected image patterns. The image patterns may have various lines in them which are to be leveled or rendered plumb as may be appropriate.

Figure 2:
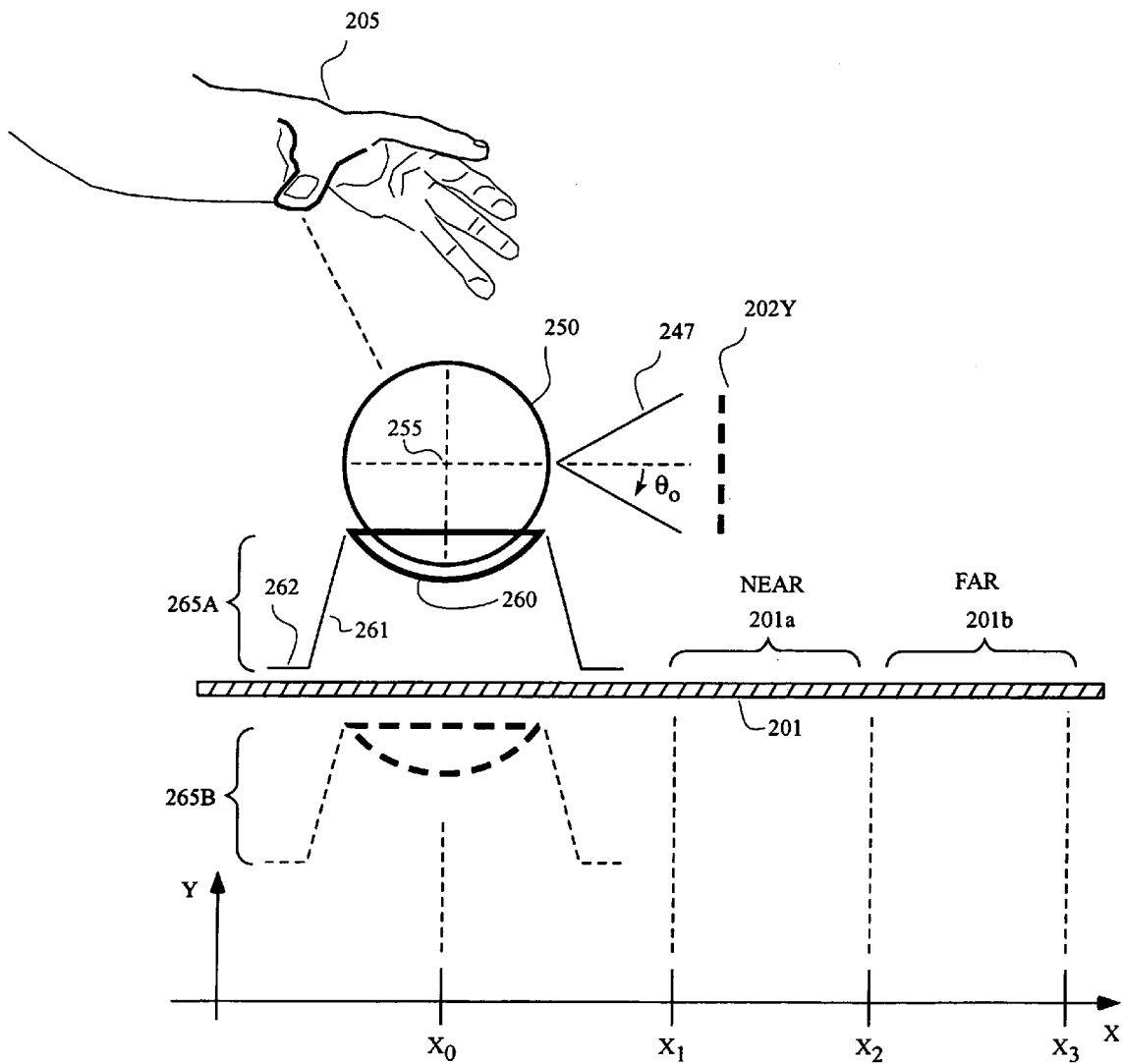
FIG. 2 is a cross sectional view showing a stackable pedestal having spherical-section defining a movement guide for a corresponding, spherically rotatable support and also showing the relative near and far projection fields on the adjacent wall surface.

FIG. 2 shows a schematic top cross sectional view of an embodiment 200 in accordance with the invention. Wall section 201 extends both laterally in the X direction and vertically in the Z direction (not shown). A base unit 265A is removably mounted to the wall 201 to extend outwardly in the Y direction. As seen, the base unit 265A includes a cup-shaped guide 260 that is dimensioned to receive spherical support unit 250 and guide the rotation of support unit 250 spherically about center point 255. Magnets may hold the support unit 250 in cup-shaped guide 260 and/or the workman's hand may urge it that way and/or the cup may extend beneath the support so that gravity keeps the support urged into the receiving cup 260.

The pedestal or base 265A that mounts to the wall (or other surface, i.e. ceiling, floor) may be structured symmetrically so that it is easily stacked with other alike units such as 265B (shown in phantom behind wall 201). Therefore a plurality of such bases 265A and 265B may be densely packed for packaging purposes and/or transportation when used in conjunction with the spherical support 250. Although not shown in FIG. 2, the stackable bases 265A and 265B provided in a kit may have different offset dimensions for offsetting the rotatable support 250 away from the wall 201 by different distances. The movement-guiding portion 260 of each pedestal may be made of a ferromagnetic metal and these may be mass produced by metal stamping or other appropriate ways. The wall-mounting portion 261 of the base may be hollow and may be made of an appropriate injection molded plastic. Base extension 262 may include holes for driving nails or thumb tacks through to mount the base 265A to the wall 201. The Base extension 262 may alternatively or additionally have a bottom section structured for removably receiving a two-sided adhesive sticky pad for attaching to the wall 201. Alternatively, the entirety of the pedestal 265A may be made of a stamped metal. Alternatively, the entirety of the pedestal 265A may have its main structure made of a molded plastic and a ferromagnetic material may then be adhesively attached underneath at a later time or painted on.

As should be apparent from FIG. 2, a user's hand 205 grasps the ball-like or other shape of support 250 and spherically rotates it about center 255 while periodically causing the beam fan-out 247 to be oriented in a pre-defined manner (e.g. parallel to) a major plane of the sphere 250 while that plane is kept level or plumb using appropriate indicators (not shown) provided in support 250 for indicating level or plumb conditions and deviations therefrom. The projected light image 202Y may then be projected onto a near field 201*a* of the wall 201 or to a further away, far field 201*b* of the wall 201. Since the energy of the projected image 202Y is distributed over a shorter distance $X_1$-to-$X_2$ when aimed at the near field 201*a* and to yet another short field distance from $X_2$-to-$X_3$ when aimed at the far field 201*b* less power needs to be provided than if the same image 202Y had to be expanded and projected across the entire distance $X_1$-to-$X_3$. In one embodiment, distance $X_1$-to-$X_3$ is about 10 to 30 feet long and the near field 201*a* is about 3 feet long and is at least as close as about 2 inches.

Figure 3A:
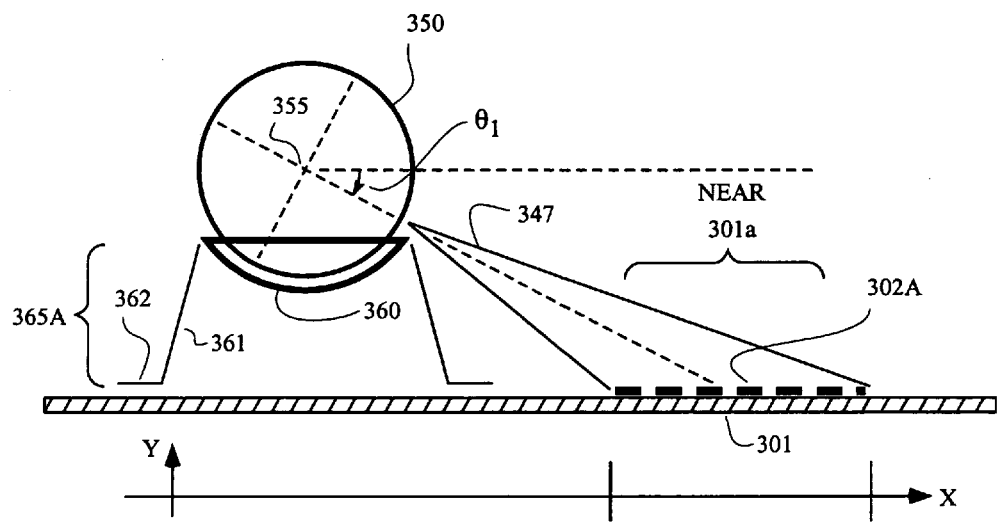
FIG. 3A is a cross sectional view showing the support of FIG. 2 rotated to illuminate the near field with a fanned-out laser line.

The cross sectional view of FIG. 3A shows a respective, spherically rotatable support 350 rotated by a first angle $\Theta_1$ off the wall parallel to thereby illuminate a near field 301*a* of wall 301 with a corresponding image pattern 302A. The image pattern 302A can be a laser line which is level to, or plumb to, the gravitational field present in the situation. Surface 301 may be a sidewall of a room or a floor or even a ceiling.

Figure 3B:
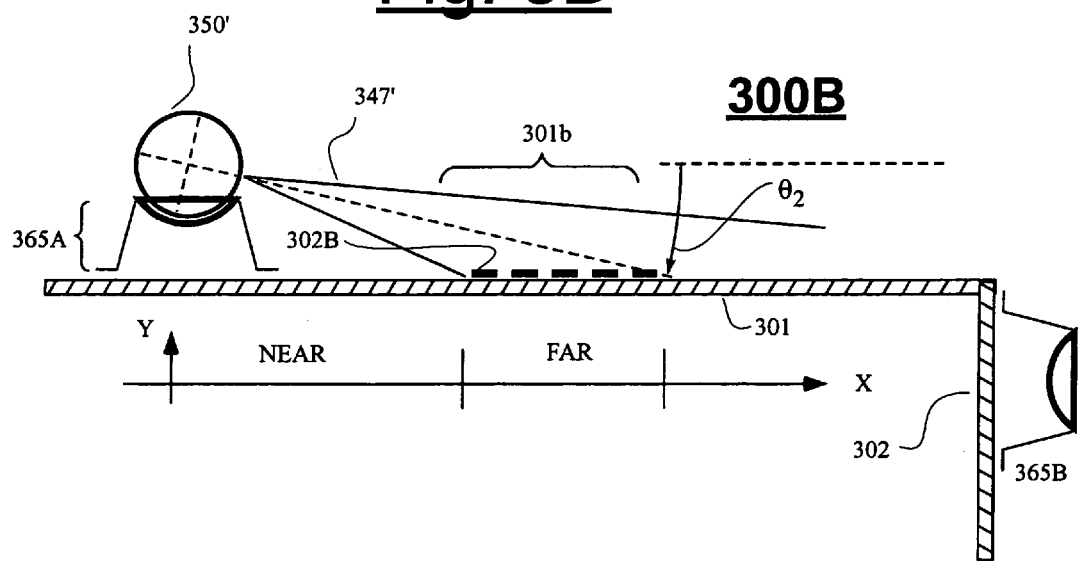
FIG. 3B is a cross sectional view showing the support of FIG. 2 rotated to illuminate the far field with a fanned-out laser line, and further indicating how around-the-corner layout may be carried out using plural ones of the support-guiding bases.

FIG. 3B shows yet another top cross sectional view of a room where wall 302 extends perpendicular to, and away from wall 301 so that the image 302B projected by the further rotated support 350' onto far field 301*b* is unable to reach the outer surface of wall 302. However, another inexpensive base 365B, similar to wall-mountable base 365A, is positioned by a workman on the outer side of wall 302 and is aligned to the level laser line 302B cast by projector 350' when that line 302B reaches the corner of walls 301 and 302. Then, because rotatable support 350' is easily popped off from base 355A (due to weak magnetic attraction or other weak means for urging support 350' into cup-shaped guide member 360) and the same rotatable projector 350' is popped into base 365B for continuing layout work around the corner and onto the outer surface of new wall 302. Layout work may continue around a series of hallways, rooms and other such structures using this bootstrapping technique. After current lay-out of wall 301 is finished, base 365A may be dismounted from wall 301 and mounted to a new wall, and then moved again.

FIG. 4 shows yet another perspective schematic view of a projection system 400 in accordance with the invention. One or a plurality of laser diodes with integrated lens or other optics 440" may be mounted inside the transparent spherical shell of support unit 450 to project their respective images, such as 445–447 outwardly and in a predefined orientation relative to major sphere plane 441. In an alternate embodiment, instead of using laser diodes, more conventional light-emitting diodes (LED's) may be used as the light source(s) and appropriate optics can be provided for shaping the output beam of the LED's as desired. An electrical battery 481 and corresponding drive electronics 482 are further provided inside the shell of spherical support 450 for powering and controlling the light sources 440". Optionally, electronic level detectors and level condition indicators (e.g. LED's of different colors) may be integrated with the driving electronics 482 for indicting to a user when a predefined major plane (e.g. 441) is in a level or plumb condition and/or how far away from level or plumb that plane is. The spherical shell of support 450 may be formed of two, detachably attached hemispheres that detach or swing open to provide access for replacing the batteries 481. Alternatively or additionally, the batteries 481 may be rechargeable through a magnetic or electrical coupling provided through the shell of support 450.

Only one, five-way bubble vial 410 is provided in the illustrated embodiment 400 of FIG. 4. Two projections 458 and 459 extend along the Z-axis of the spherical housing 450 to control the degrees of rotational freedom provided to this sphere 450 in different orientations. For example, when the sphere 450 is oriented as shown so that projection 458 is adjacent to guide extension 468, the sphere 450 is prevented from rotating in the C direction about X-axis 451 by more than a negligible amount. Projections 458 and 459 may have chamfered (keyed) surfaces that determine the amount of movement that will be allowed when the support 450 is in certain angled orientations. The keyed surfaces of projections 458 and/or 459 can be used to prevent a workman from accidentally rotating a projected beam 447 out of a leveled orientation without realizing it. Since the single 5-way level indictor 410 is not sufficient to guarantee that major plane 441 is in a level condition, plumb indicators may be included in one or both of projections 458 and 459 for verifying that the Z-axis 453 of the sphere 450 remains plumb as the light source 440 is rotated together with the sphere 450 about the circumference of major circle 441.

The sphere 450 can still be freely rotated around the B direction (about Y axis 452) so as to point to the ceiling or floor as desired, and in such as case, the keyed projections 458 and 459 move away from movement limiters such as 468 so that the sphere may be spherically rotated with a greater degree of freedom.

The spherically rotatable support of the image projecting light sources (e.g. 440) may take on shapes other than the illustrated ball-shape. However, the ball-shape is advantageous in that it intuitively indicates to users that it is to be spherically rotated within the receiving cup 460. A portable and efficient structure 450 is provided for manually aligning projected light images 445–447 among different walls and for easily moving the projector 450 from one mounting unit 461 to the next as desired.

Figure 5:
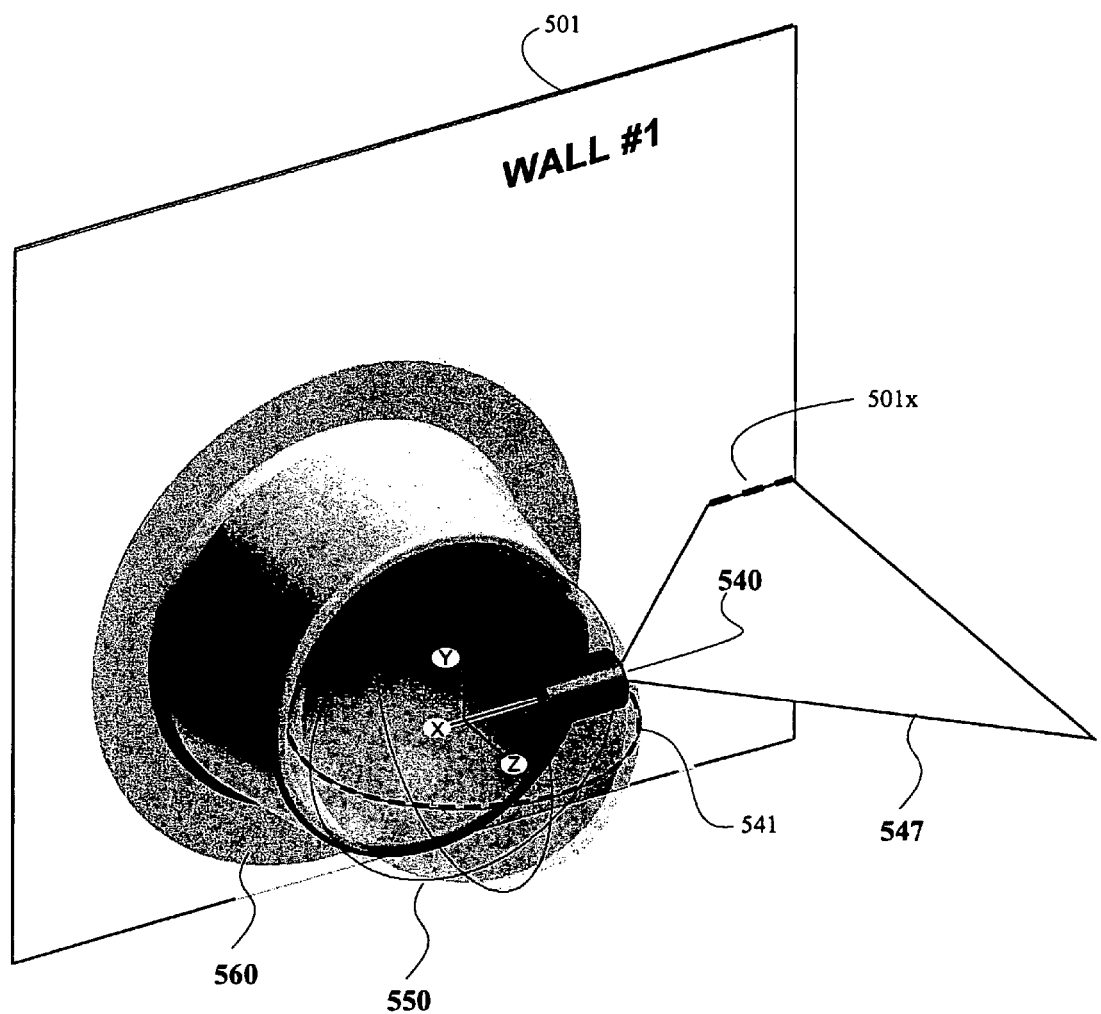
FIG. 5 is a perspective showing a spherically-shaped support that is spherically rotatable within a wall-mounted base having a spherically-shaped receiving cup, where the fanout from the light source intersects with the wall to project a line on that wall.

FIG. 5 is a perspective showing a spherically-shaped support 550 that is spherically rotatable within a wall-mounted base 560 having a spherically-shaped receiving cup, where the fanout 547 from the light source 540 intersects with the adjacent wall 501 to project a line 501*x* on that wall. At this stage, line 501*x* does not have to be level since no means has yet been used to align the central X-Y-Z reference frame of major equatorial circle 541 to a gravitational or other reference frame.

Figure 6:
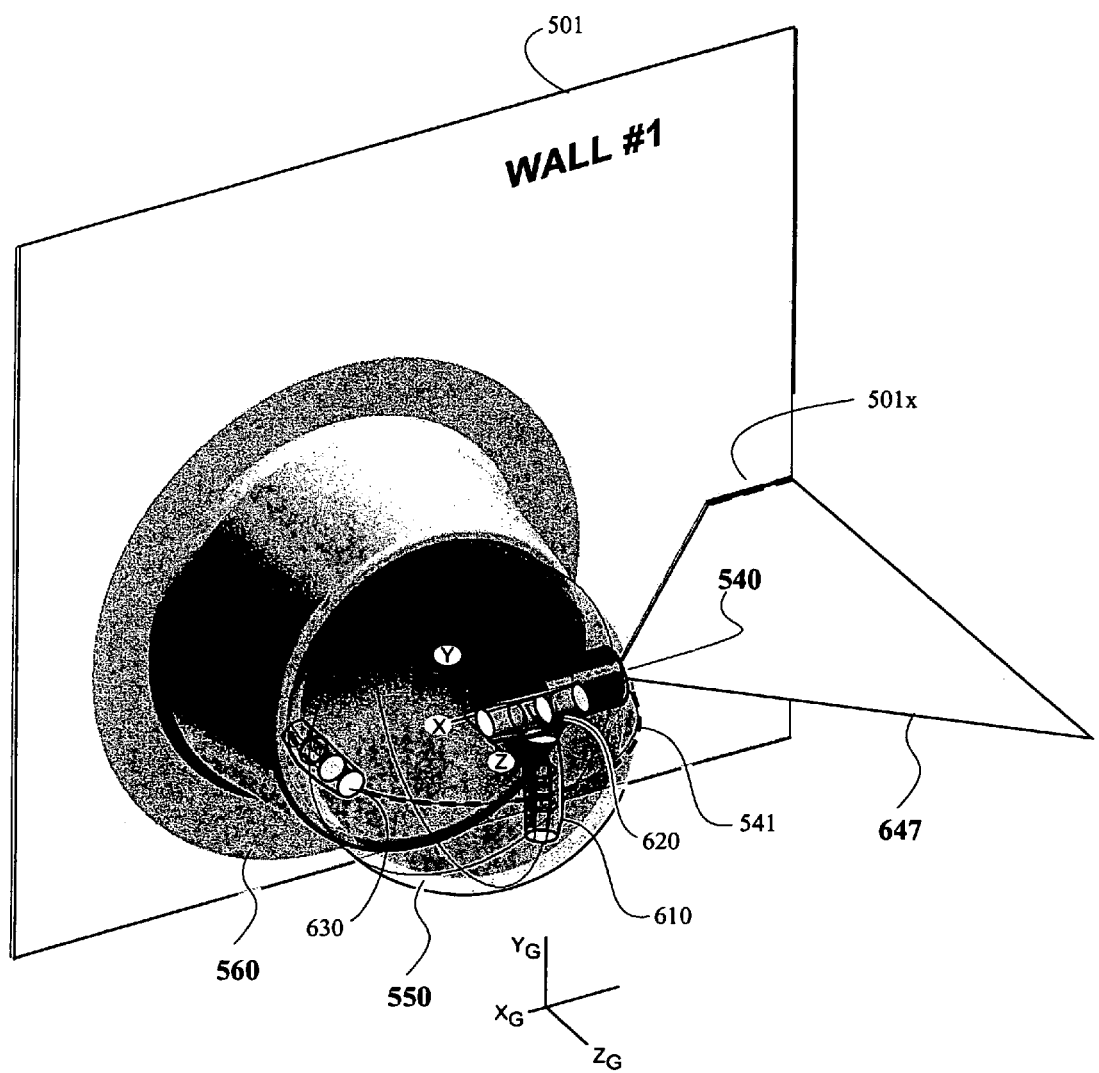
FIG. 6 is a perspective showing the structure of FIG. 5 with a plurality of level/plumb indicators included in the spherically rotatable support so that a predefined reference frame of the support can be spherically rotated to align with a gravitational reference frame.

FIG. 6 is a perspective showing the structure of FIG. 5 with a plurality of force-sensing alignment indicators (e.g., level/plumb indicators) 610, 620, 630 included in the spherically rotatable support 550 so that a predefined reference frame (major circle 541) of the support can be spherically rotated to align with a gravitational or other field-defined reference frame. Once the support 550 is spherically rotated so that its central X-Y-Z reference frame (541) aligns with the illustrated reference frame (e.g., gravitational frame $X_G$-$Y_G$-$Z_G$) and the support 550 is held in place by magnets (not shown) or otherwise, it will be known that the intersection 501*x* of fanout 647 with wall 501 will define a leveled illuminated line 501*x*. The force-sensing alignment indicators 610, 620, 630 (e.g., conventional cylindrical bubble vials respectively aligned to the X-Y-Z reference frame of circle 541) may be used to keep circle 541 in a level condition (or plumb condition) as that major circle is rotated and the projected beam fanout 647 moves in unison with the circle.

Figure 7:
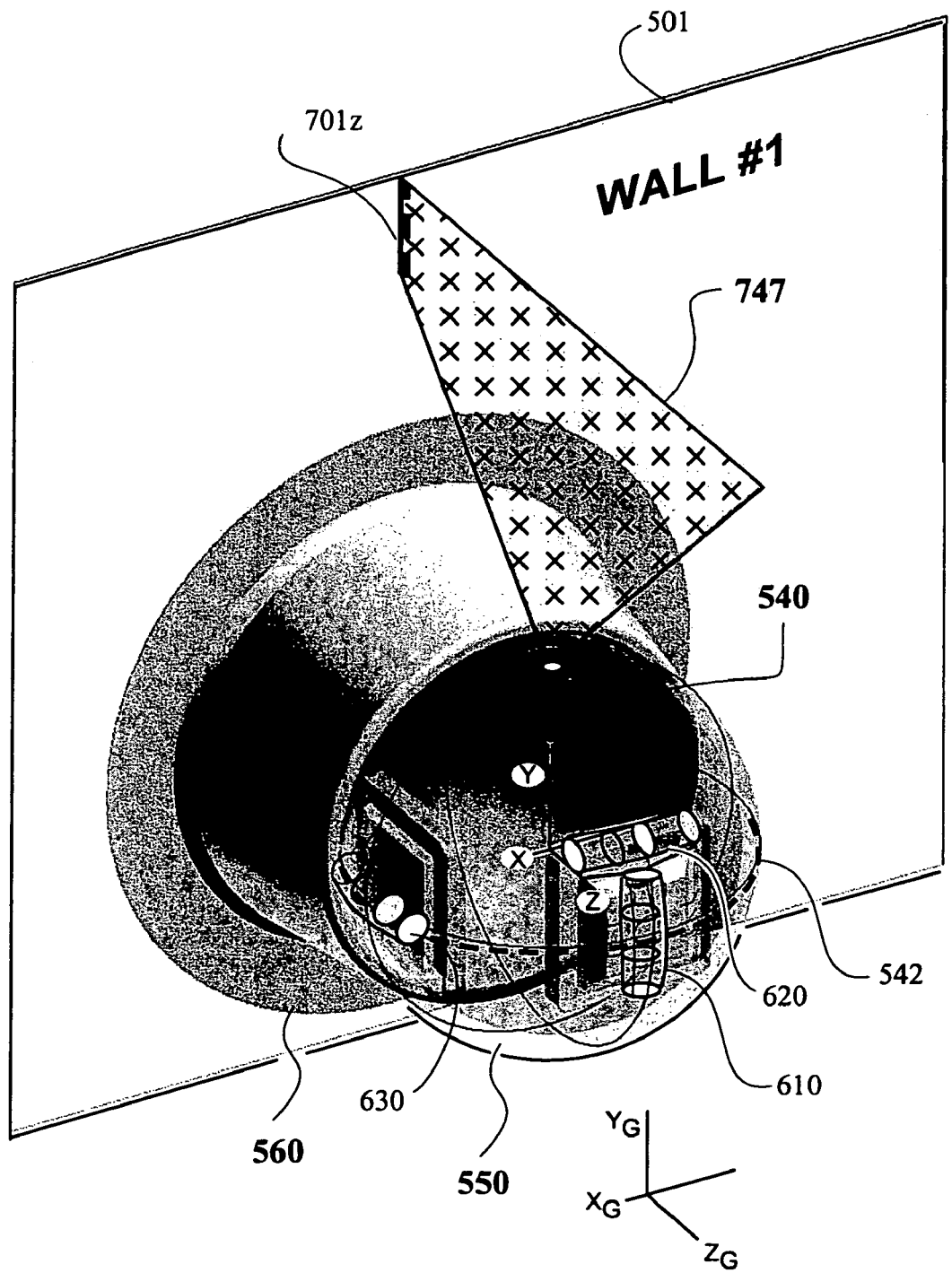
FIG. 7 is a perspective showing a structure similar to that of FIG. 6 where the level/plumb indicators are used to plumb a vertical line projected onto the adjacent wall by the spherically rotated support.

FIG. 7 is a perspective showing a structure 700 similar to that of FIG. 6 where the level/plumb indicators are used to plumb a vertical line 701z projected onto the adjacent wall by the spherically rotated support 550. As may be appreciated, the spherical rotatability of the support's reference frame allows the projected image 701z to be aimed in a wide variety of directions, not only onto regions of adjacent wall 501, but also onto other walls, and/or the ceiling and/or the floor.

Figure 8:
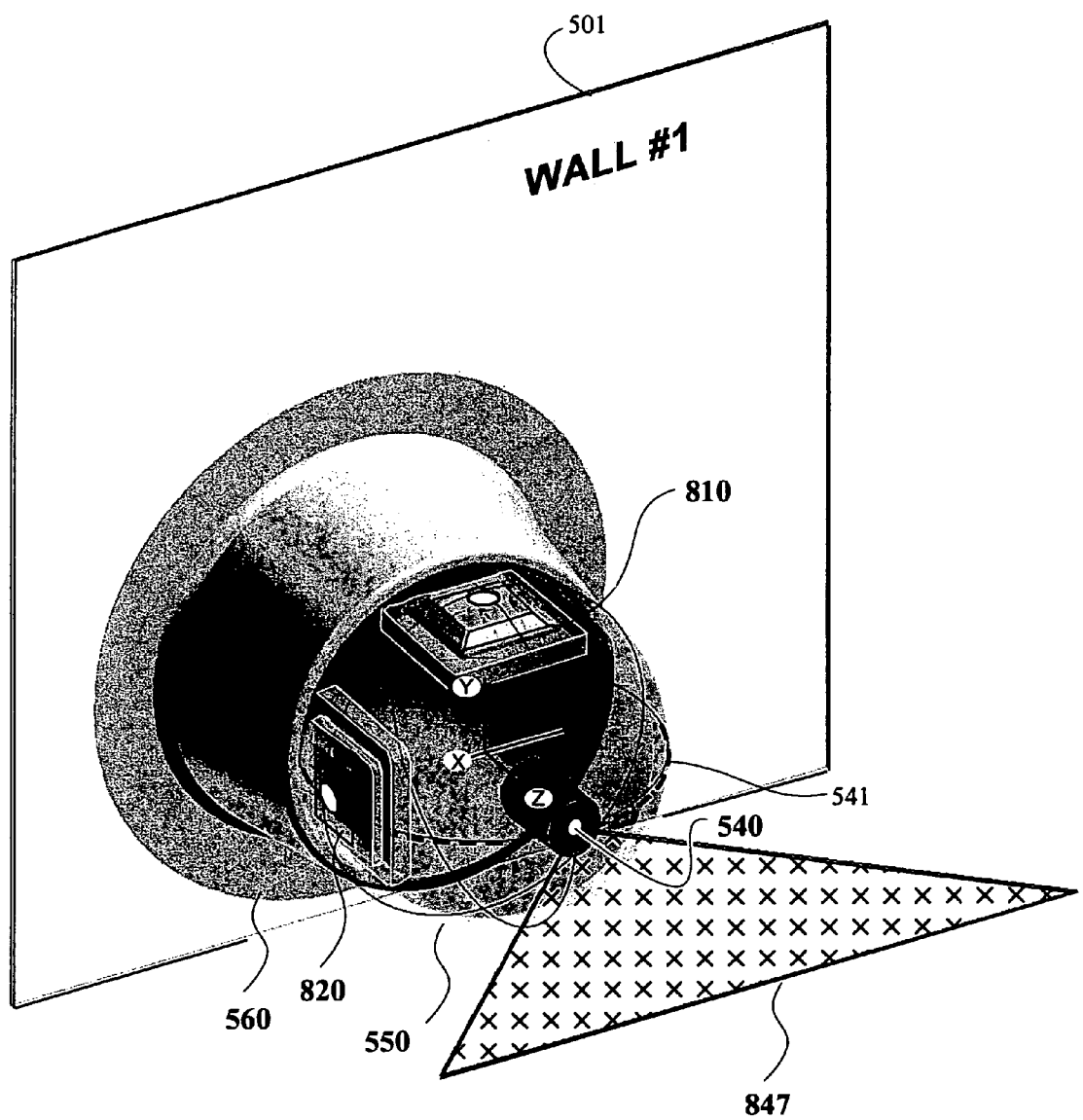
FIG. 8 is a perspective showing a structure similar to that of FIG. 6 where 5-way level/plumb indicators are embedded inside a transparent spherical shell.

FIG. 8 is a perspective showing a structure 800 similar to that of FIG. 6 where 5-way level/plumb indicators 810, 820 are embedded inside a transparent spherical shell of the support. As seen, the projected beam 847 is aimed at the wall 180 degrees opposite to wall 501. The 5-way indicators 810, 820 may be used to level or plumb the projected image on the opposite wall (not shown).

Figure 9:
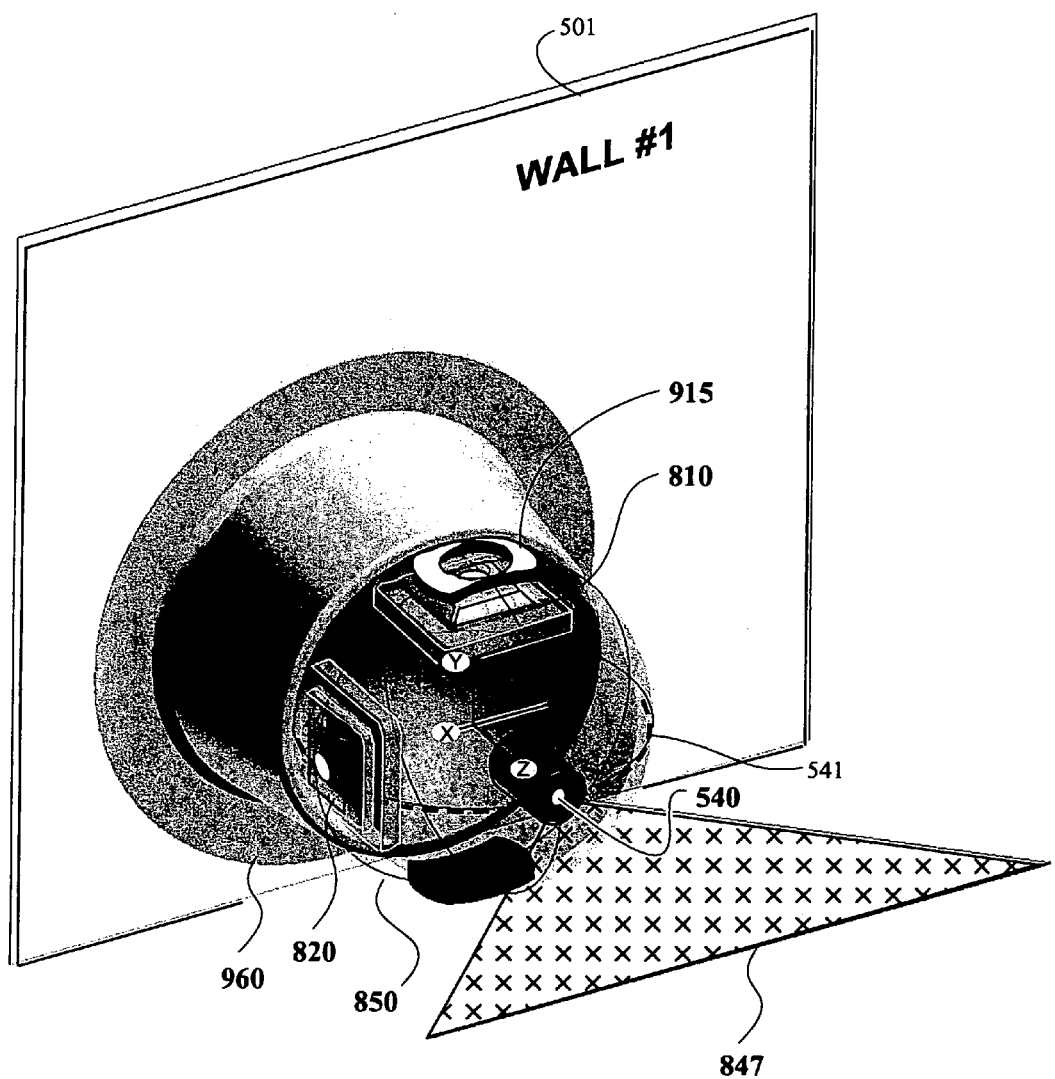
FIG. 9 is a perspective showing a structure similar to that of FIG. 8 where movement restrictors are placed on the outside of the spherical shell, over the 5-way level/plumb indicators.

FIG. 9 is a perspective showing a structure 900 similar to that of FIG. 8 where movement restrictors 915 are placed on the outside of the spherical shell, over the 5-way level/plumb indicators. In one embodiment, the movement restrictors 915 take on the shape of circular washers with opposed sides flattened off so that some degree of up/down movement is allowed for the projected image 847 when it aimed at an opposite wall. However, if the projected image 847 is aimed at the adjacent wall 501 and/or at an orthogonal wall (90 degrees to wall 501), the outer diameters of the movement restrictors 915 abut against the rim of the shell receiving cup and prevent it from being rotated along all 3 axes of rotational freedom. (See again the blocked rotation C of FIG. 4.)

Figure 10:
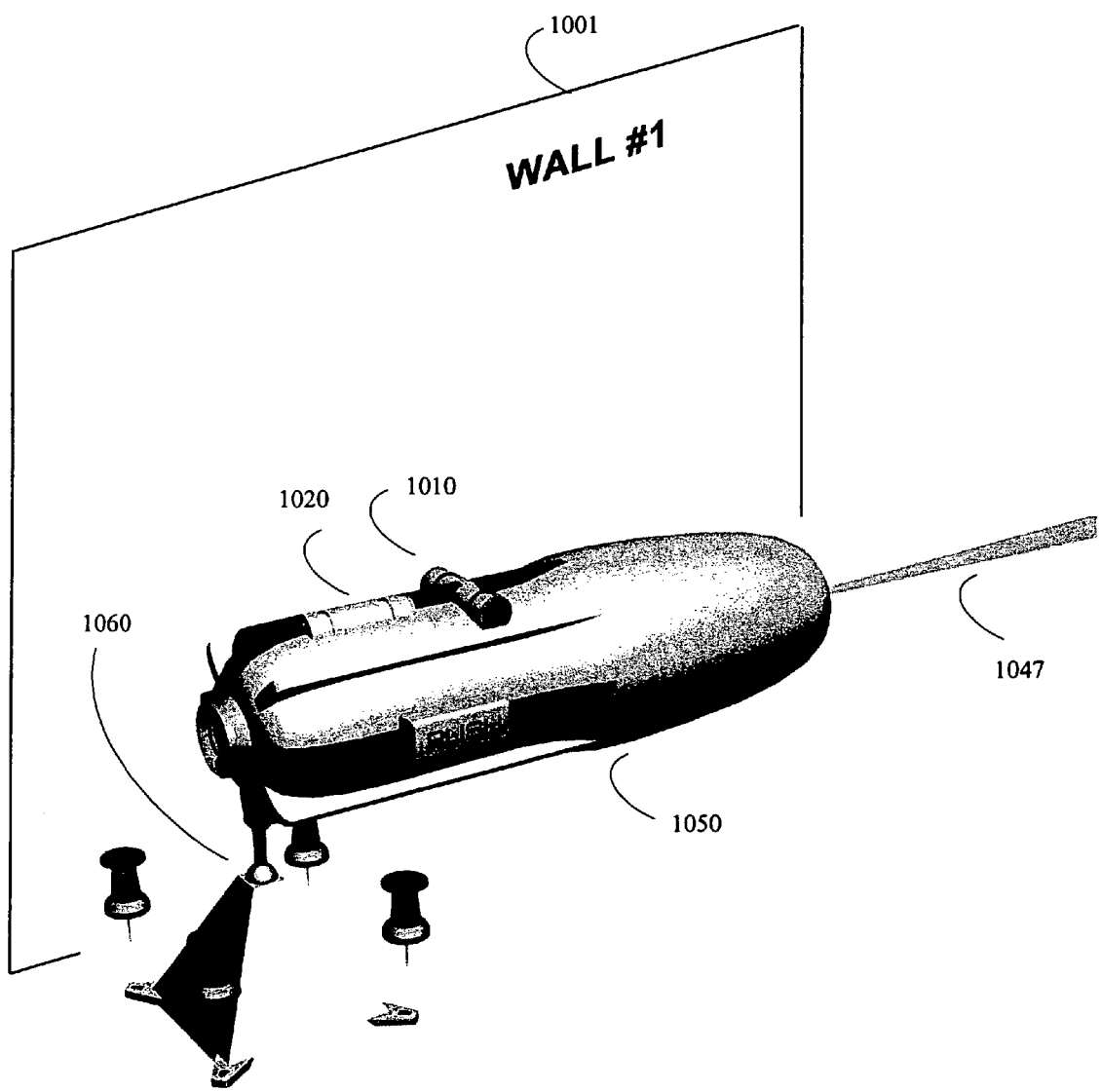
FIG. 10 is a perspective showing a projector support mounted to a base with a ball joint where the support includes level/plumb indicators for aligning its projected image to a gravitational reference frame.

FIG. 10 is a perspective showing another projector support 1050 mounted to a thumb-tack mounted base with a ball joint 1060 where the support includes level/plumb indicators 1010, 1020 for aligning its projected image 1047 to a gravitational reference frame. As can be appreciated, the ball joint 1060 defines a center of spherical rotation for support 1050. Additional pivot points and/or rotational means may be added to allow the support 1050 greater degrees of freedom in movement. The level/plumb indicators 1010, 1020 are used for aligning the projected image 1047 irrespective of what set of joints are provided for moving support 1050.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A pattern projecting system comprising:
    (a) a light source configured to project an illuminating beam having a non-circularly patterned cross section so that an intersecting projection of the beam onto a spaced away, reflective and facing wall, if the wall is present, will produce an illuminated marking on the wall where the illuminated marking is substantially in the shape of a line or another fanning-out pattern that is parallel-wise alignable to a hypothetical line on the wall by virtue of the fanning-out shape of the illuminated marking;
    (b) a spherically rotatable support having a center of spherical rotation,
        where said center has associated therewith first, second and third hypothetical planes that are orthogonal to one another and move in unison with said support, and the first through third planes are defined to intersect with one another and with the center of spherical rotation,
        where said light source is mounted to the spherically rotatable support such that, in one fixed or user-selected mounting orientation of the light source, its projected illuminating beam will have a fanout of its non-circularly patterned cross section aligned to the first hypothetical plane at a predefined angle,
        where said spherically rotatable support includes a guided surface which can be urged against a supplied movement guide so as to guide movement of the spherically rotatable support in a spherical rotation about said center of spherical rotation; and
    (c) one or more orientation indicators operatively coupled to the spherically rotatable support and adapted to at least indicate if the first hypothetical plane is in a level condition, wherein said one or more orientation indicators are located so as to not block said light source from projecting the illuminated beam away from the spherically rotatable support.

2. The projecting system of claim 1 and further comprising:
(d) a first magnetic urging means operatively connected to the spherically rotatable support so that a magnetic urging force can be used to urge the guided surface against the supplied movement guide.

3. The projecting system of claim 2 wherein:
(d.1) the first magnetic urging means includes a permanent magnet.

4. The line projecting system of claim 2 wherein:
(d.1) the first magnetic urging means includes a ferromagnetic material.

5. The projecting system of claim 1 wherein:
(a.1) the light source has a maximum beam output power of about 1 milliWatt or less.

6. The projecting system of claim 5 wherein:
(a.2) the light source includes a solid state diode laser.

7. The projecting system of claim 1 and further comprising:
(d) a first wall-mountable pedestal that is fastenable to a vertical wall, the pedestal having a respective first movement guide for serving as said supplied movement guide and being adapted to space the center of spherical rotation of the support by a first distance of at least about an inch away from a corresponding wall to which the pedestal is connected while said movement of the spherically rotatable support is being guided in the spherical rotation by the first movement guide.

8. The projecting system of claim 7 wherein:
(d.1) the first wall-mountable pedestal is structured to be stackably packed with a second wall-mountable pedestal that has a respective second movement guide and is adapted to space the center of spherical rotation of the support by a second distance of at least about an inch away from a corresponding wall to which the second pedestal is connected while said movement of the spherically rotatable support is being guided in the spherical rotation by the second movement guide.

9. The projecting system of claim 1 and further comprising:
(d) a plurality of wall-mountable pedestals each having a respective movement guide for serving as said supplied movement guide and each being adapted to space the center of spherical rotation of the support by a predefined first distance away from a corresponding wall to which the pedestal is connected while said movement of the spherically rotatable support is being guided in the spherical rotation by the respective movement guide,
wherein each wall-mountable pedestal includes fastening means for fastening the pedestal to a vertical wall, and
wherein the spherically rotatable support is removably and retainingly attachable to each of the plurality of wall-mountable pedestals such that the support can be easily removed from a first of the pedestals while the first pedestal is fastened to a vertical wall and easily and retainingly attached to a second of the pedestals that is also fastened to the same or another vertical wall.

10. The projecting system of claim 1 wherein:
(c.1) said alignment of the fanout of the non-circularly patterned cross section to the first hypothetical plane at a predefined angle is constituted by the fanout being parallel to the first hypothetical plane.

11. The projecting system of claim 1 wherein:
(c.1) at least one of said one or more orientation indicators can provide its respective indication of a level plane condition while the light source is projecting its illuminating beam onto a nearby vertical wall.

12. The projecting system of claim 1 wherein:
(c.1) at least one of said one or more orientation indicators is adapted to indicate if the first hypothetical plane is in a plumb condition.

13. The projecting system of claim 1 wherein:
(c.1) at least one of said one or more orientation indicators is fastened to the spherically rotatable support while the light source is projecting its illuminating beam onto a nearby wall.

14. The projecting system of claim 1 wherein:
(c.1) at least one of said one or more orientation indicators is disposed to be viewed head on by a user facing a supporting vertical wall while the spherically rotatable support has its guided surface urged against a supplied movement guide and the movement guide is mounted to the supporting vertical wall thereby enabling the user to use the at least one orientation indicator to determine with such head on viewing if the first hypothetical plane is in a level condition.

15. The projecting system of claim 1 wherein:
(c.1) at least one of said one or more orientation indicators includes a bubble system for indicating how close to level condition the first hypothetical plane is.

16. The projecting system of claim 1 wherein:
(c.1) at least one of said one or more orientation indicators includes a five-way bubble vial.

17. A method for projecting an illuminating line or another fanning-out luminous pattern onto an adjacent surface and/or onto a spaced away surface, where the illuminating line or other fanning-out luminous pattern is parallel-wise alignable to a hypothetical on-surface line of the adjacent surface or s paced away surface, the method comprising:
(a) connecting a movement guide to the adjacent surface, the movement guide being structured to guide a corresponding and supplied, spherically rotatable support along a spherical rotation;
(b) urging a corresponding and provided, spherically rotatable support into engagement with the movement guide so that the urged support, when propelled, will move in accordance with a spherical rotation guided by the movement guide, the guided spherical rotation having a center of spherical rotation, where the provided, spherically rotatable support includes a light projector that projects a fanned-out light pattern, the light pattern having a projection line substantially intersecting the center of spherical rotation, and where the provided, spherically rotatable support includes one or more indicators of its orientation relative to gravity the one or more indicators being able to provide their respective indications of orientation while the fanned-out light pattern is projected onto said adjacent surface or spaced away surface;
(c) causing the light projector to project a first illuminating and fanned-out light pattern in a first field of one of said surfaces; and
(d) rotating the support so as to cause the laser line projector to project a second illuminating and fanned-out light pattern in a different, second field of one of said surfaces, where the projected second illuminating and fanned-out light pattern is aligned to a fanout axis of the projected first illuminating and fanned-out light pattern.

18. The method of claim 17 and further comprising:

(e) using said one or more indicators to cause the projected first illuminating and fanned-out light pattern to include a corresponding fanout axis that is level or plumb.

19. The method of claim 17 and further comprising:

(e) using said one or more indicators to verify that the projected second illuminating and fanned-out light pattern includes a corresponding fanout axis that is level or plumb.

20. A method comprising:

(a) removably and retainingly attaching a spherically rotatable housing to a rotation guide that guides rotation of the housing to be spherical and centered about a spherical center of rotation of the rotation guide, where the housing includes a light projector that projects an illuminating pattern and the illuminating pattern has a fanout axis that can be aligned to be parallel to a predefined, first hypothetical line drawn on a surface toward which the illuminating pattern is projected; and (b) observing an indicator indicating whether the fanout axis of the projected pattern, when projected is parallel to the predefined, first hypothetical line where the first hypothetical line defines a predefined angle with a force vector of a predefined force field.

21. The method of claim 20 wherein said force field is gravity.

22. The method of claim 20 wherein:

(a.1) the illuminating pattern includes an illuminated line.

23. The method of claim 20 wherein:

(a.1) the rotation guide includes a magnetic system for removably and retainingly attaching the housing to the rotation guide.

24. The method of claim 20 wherein:

(b.1) the predefined angle is 0° or 90°.

25. A machine-implemented method comprising:

(a) projecting from a spherically rotatable housing, an illuminating pattern that has a fanout axis that can be aligned to be parallel to a predefined, first hypothetical line drawn on a surface onto which the illuminating pattern is projected; and (b) indicating whether during said projecting the fanout axis of the projected pattern is parallel to the predefined, first hypothetical line where the first hypothetical line defines a predefined angle with a force vector of a predefined force field;

wherein the spherically rotatable housing mates with a supplied movement guide that guides movement of the spherically rotatable support to be a spherical rotation about a center of rotation defined by the movement guide.

26. The method of claim 25 wherein:

(a.1) the illuminating pattern includes an illuminated line.

27. : The method of claim 25 wherein:

(b.1) the predefined angle is 0° or 90°.

28. A projector of a luminous pattern, the projector comprising:

(a) a light source that generates the luminous pattern, wherein the luminous pattern is non-circular and is characterized by a fanout axis that can be parallel-wise aligned to a hypothetical line of predefined orientation hypothetically drawn on a projection surface, if present, onto which the luminous pattern is projected;

(b) a spherically rotatable housing that houses said light source, the housing having a guided surface which can be mated with a supplied movement guide so as to guide movement of the spherically rotatable housing in a spherical rotation about a center of spherical rotation whose position is defined by the supplied movement guide, where said luminous pattern moves with rotation of the housing; and (c) an orientation indicator coupled to the housing and operative while the luminous line pattern is being generated to indicate if the fanout axis of the generated luminous line pattern is at a predefined angle relative to gravity, wherein said orientation indicator is located so as not to block the housed light source from projecting the luminous pattern out of the spherically rotatable housing.

29. The projector of claim 28 wherein said predefined angle is 0° or 90°.

30. The projector of claim 28 wherein:

(b.1) the spherically rotatable housing includes a magnetic circuit component for magnetically retaining the housing to the supplied movement guide.

* * * * *